United States Patent [19]

Gaucher

[11] Patent Number: 4,787,243

[45] Date of Patent: Nov. 29, 1988

[54] DEVICE FOR DETECTING A DIMENSION, IN PARTICULAR A TREAD WIDTH ON A PATH

[75] Inventor: Michel M. Gaucher, Le Mesnil Saint Denis, France

[73] Assignee: Electronique Serge Dassault, Saint Cloud, France

[21] Appl. No.: 143,000

[22] Filed: Jan. 12, 1988

[30] Foreign Application Priority Data

Jan. 13, 1987 [FR] France ................................ 87 00285

[51] Int. Cl.[4] ...................... B60C 11/00; G01M 17/02

[52] U.S. Cl. .................................. 73/146; 200/86 A; 235/99 A; 340/940

[58] Field of Search ............ 73/146; 200/86 R, 86 A; 235/99 R, 99 A; 340/940; 33/123

[56] References Cited

U.S. PATENT DOCUMENTS

| | | | |
|---|---|---|---|
| 1,849,730 | 3/1932 | Morse | 73/146 |
| 2,051,042 | 8/1936 | Hendel et al. | 73/146 |
| 2,126,327 | 8/1938 | Hendel et al. | 73/146 |
| 2,163,960 | 6/1939 | Paver | 200/86 R |
| 2,313,156 | 3/1943 | Kratt, Jr. | 73/146 |
| 2,525,824 | 10/1950 | Nagel | 235/92 |
| 2,801,053 | 7/1957 | Roscoe | 235/99 |
| 3,183,481 | 5/1965 | McCrory | 73/146 |
| 3,398,397 | 8/1968 | O'Connell | 73/146 |
| 3,748,443 | 7/1973 | Kroll et al. | 200/86 R |
| 3,835,449 | 9/1974 | Viracola | 200/86 R |
| 4,712,423 | 12/1987 | Siffeet et al. | 73/146 |

FOREIGN PATENT DOCUMENTS

| | | |
|---|---|---|
| 530544 | 7/1931 | Fed. Rep. of Germany . |
| 1066465 | 6/1954 | France . |

*Primary Examiner*—Donald O. Woodiel
*Attorney, Agent, or Firm*—Staas & Halsey

[57] ABSTRACT

The device comprises: an elongate support part (4) suitable for being embedded in the path and having a low upstanding wall (17) running along the edge thereof; a plate (30) cantilevered out from the low wall (17) with its cantilevered portion being subdivided into tongues (38) by slots (39) which extend perpendicularly to the longitudinal direction of the support part (4); pressure transducers received in the support part (4) beneath said tongues (38); resilient means between the tongues (38) and the transducers; and electrical connection means (350) making connections with the pressure transducers.

10 Claims, 3 Drawing Sheets

DEVICE FOR DETECTING A DIMENSION, IN PARTICULAR A TREAD WIDTH ON A PATH

FIELD OF THE INVENTION

The present invention relates to a device for detecting a dimension, in particular a tread width on a path. More precisely, it is applicable for the purposes of vehicle classification to detecting the widths of the tires and the spacing between the tires of vehicles passing along a road.

BACKGROUND OF THE INVENTION

Devices are known which measure the width of a vehicle tire on the ground as the vehicle passes along a road. In general, such devices comprise a pressure sensor embedded in the ground close beneath the zone on which the vehicle runs.

Such devices are not capable of accurately detecting tire widths and the spacing between tires of a vehicle as it passes.

The invention seeks to remedy this drawback. To this end, it provides a device for accurately detecting a dimension, and in particular a tread width on a path.

SUMMARY OF THE INVENTION

More precisely, the present invention provides a device for detecting a dimension, in particular a tread width on a path, the device comprising:

- an elongate support part suitable for being embedded in the path and having a low upstanding wall running along the edge thereof;
- a plate cantilevered out from the low wall with its cantilevered portion being subdivided into tongues by slots which extend perpendicularly to the longitudinal direction of the support part;
- pressure transducers received in the support part beneath said tongues;
- resilient means between the tongues and the transducers; and
- electrical connection means making connections with the pressure transducers.

In a preferred embodiment of the invention the pressure transducers are organized as a contactless keyboard.

The keyboard advantageously comprises a bottom portion having first electrically conductive pads thereon, a top portion having second electrically conductive pads thereon facing the first pads, and an intermediate portion made of electrically insulating material interposed between the top and bottom portions of the keyboard and having holes therethrough level with said first and second pads, with a key being defined by the overlap zone between a particular first pad of the bottom portion and a particular second pad of the top portion, with the keys being connected by the connection means to detection means suitable for detecting electrical conduction between the bottom portion and the top portion of the keyboard.

According to an aspect of the invention, at least one key has a tongue thereover.

Advantageously, each conductive pad of the keyboard comprises two half-pads which are interconnected by an electric wire which is connected to the detector means.

In a preferred embodiment of the device in accordance with the invention, the electrical connection means include demultiplexer means for organizing the electric wires associated with the conductive pads as a matrix.

Preferably, the resilient means comprise a layer of waterproof material which is chemically inert with respect to corrosive substances such as hydrocarbons and which is suitable for transmitting forces applied thereto to the pressure transducers.

Preferably, the resilient material is an elastomer, e.g. a synthetic rubber.

The material constituting the support part is preferably a metal alloy, for example an aluminum alloy.

Preferably, the material constituting the plate is stainless steel.

BRIEF DESCRIPTION OF THE DRAWINGS

An embodiment of the invention is described by way of example with reference to the accompanying drawings, in which.

In several respects the accompanying drawings include information of a definitive nature. In addition, geometry has a substantial effect on a device in accordance with the invention. Consequently, the accompanying drawings may be used not only to improve understanding of the present invention, but may also contribute to the definition of the invention, wherever appropriate.

DESCRIPTION OF THE PREFERRED EMBODIMENT

Figure 1:
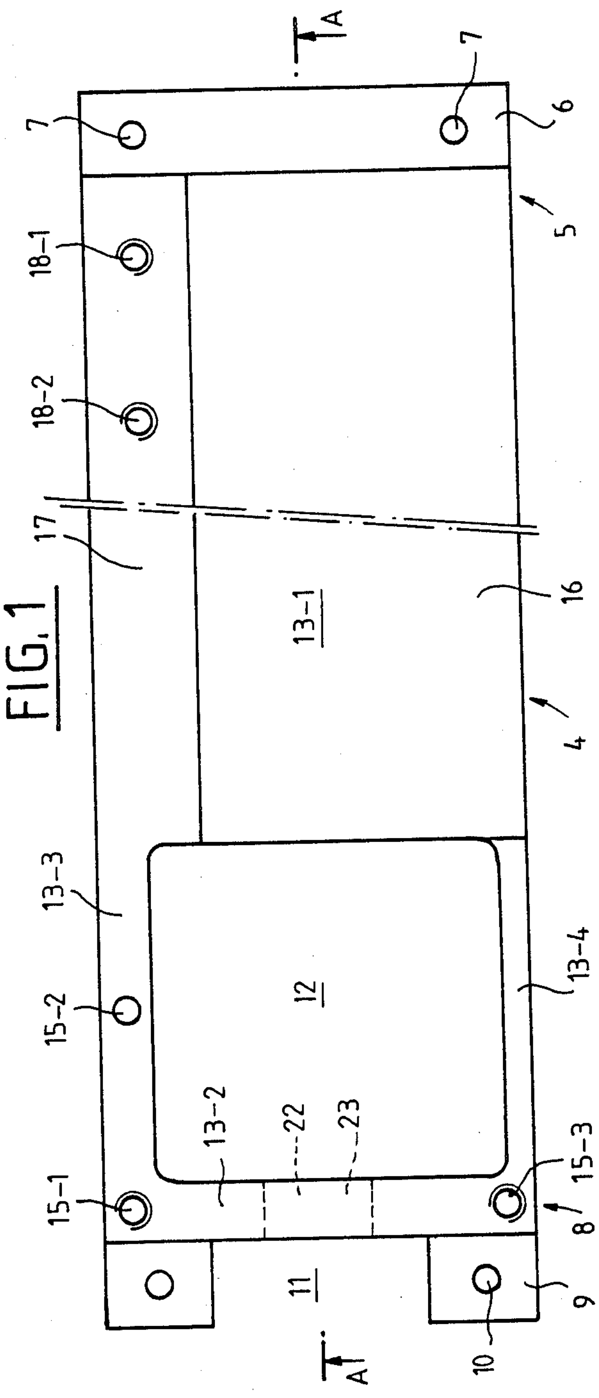
FIG. 1 is a plan view of a support part for a device in accordance with the invention.

FIG. 1 shows an elongate support part 4 suitable for being embedded in a path.

The support part 4 is generally rectangular in shape and is made of metal, e.g. an aluminum alloy such as AU4G or AG5.

One end 5 of the support part 4 has a flange 6 with fixing holes 7 therethrough, e.g. with a diameter of 5 mm.

The other end 8 of the support part 4 has a flange 9 with similar fixing holes 10, e.g. having a diameter of 5 mm.

The flange 9 is axially notched at 11 in order to facilitate passing connections of the connection means which connect the pressure transducers to the detector means as described below.

For example, the support part 4 may be 1,570 mm long, 80 mm wide, and 28 mm deep.

The flanges 6 and 9 may be 80 mm long, 15 mm wide and 5 mm thick.

The axial notch 11 is 40 mm long and 15 mm wide.

Figure 2:
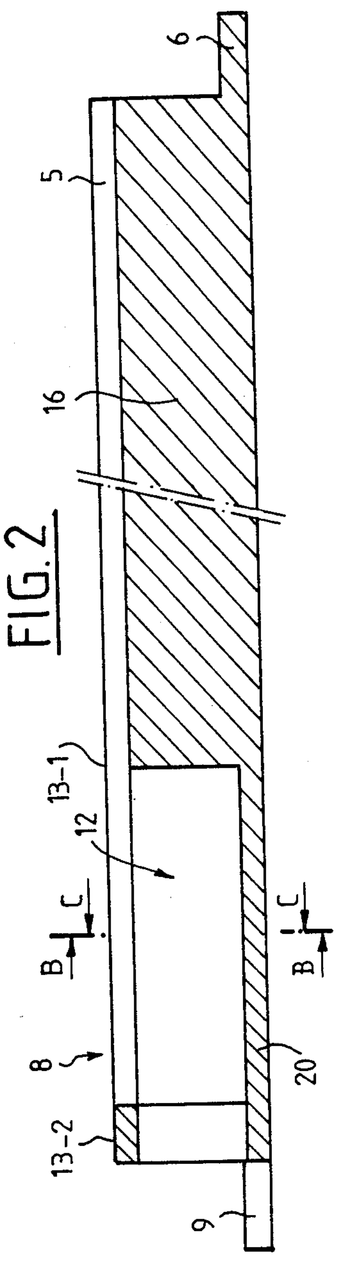
FIG. 2 is a longitudinal section on line A—A through the support part in accordance with the invention.

FIG. 2 is a longitudinal section on line A—A through the support part 4 showing that a rectangular-shaped void 12 is formed near the end 8 in the support 4 and is surrounded by four side walls individually referenced 13-1 to 13-4, and is closed by a bottom 20.

The wall 13-1 is constituted by the remaining portion 16 of the support part 4. The wall 13-2 which is opposite to the wall 13-1 is constituted by the end 8 of the support part 4, it may be 10 mm thick, for example.

The bottom 20 may be 4 mm thick, for example.

Figure 3:
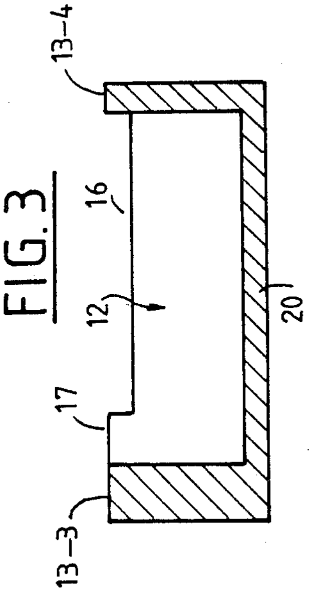
FIG. 3 is a cross-section on line B—B through the support part in accordance with the invention.

FIG. 3 is a cross-section on line B—B through the support part 4 showing that wall 13-3 is 10 mm thick for example and that opposite wall 13-4 is 5 mm thick, for example the void 12 is 60 mm long, 65 mm wide, and 24 mm deep, for example.

Returning to FIG. 1, two holes 15 having individual references 15-1 and 15-2 are drilled vertically through the wall 13-3. A hole referenced 15-3 is drilled vertically through the wall 13-4. The holes 15 are 5 mm in diameter, for example, and serve to fix a plate on the support part 4 (the plate is described below).

The remaining portion 16 of the support part 4 has a low wall or rim 17 running along one of its long edges.

Tapped holes 18 having individual references 18-1, 18-2, . . . are drilled vertically into the low wall 17. The holes 18 may be 4 mm in diameter, for example.

The low wall 17 may be 1,500 mm long, 20 mm wide, and 4.5 mm high, for example.

Figure 4:
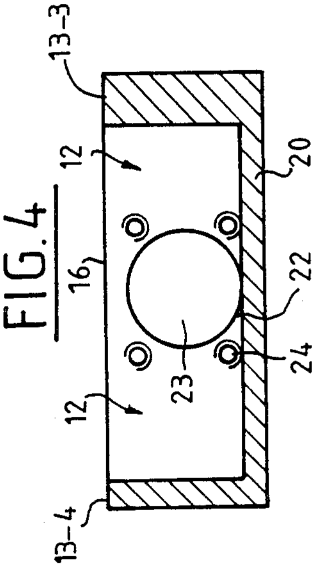
FIG. 4 is a cross-section on line C—C (i.e. looking in the opposite direction to B—B) through a support part in accordance with the invention.

Reference is now made to FIG. 4 which shows a crosssection on line C—C through the support part 4 in accordance with the invention. A central hole 22 of diameter 20 mm, for example, is drilled through the wall 13-2 in order to enable a waterproof connector 23 to be installed for providing connection to connection means which are described below. Holes 24 are drilled through the wall around the periphery of the hole 22 for the purpose of fixing the waterproof connector 23.

Figure 5:
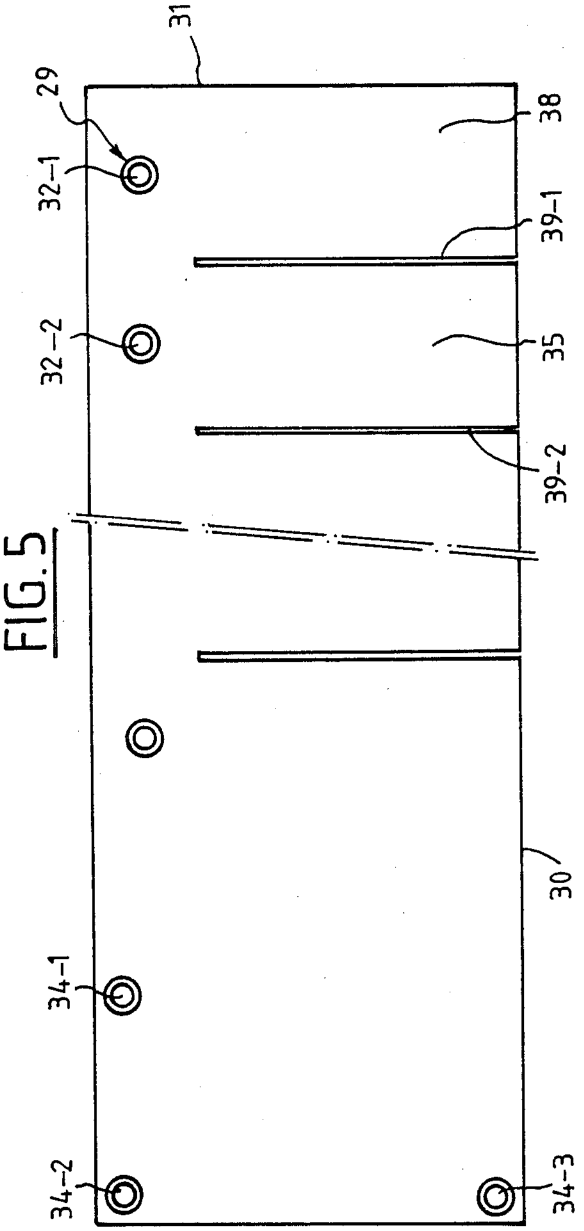
FIG. 5 is a plan view of a plate in accordance with the invention.

Reference is now made to FIG. 5 which is a diagrammatic view of a plate 30 of the device in accordance with the invention which is fixed so as to be cantilevered out from the low wall 17 over the support part 4 described with reference to FIG. 1.

The plate 30 covers the entire support part 4. For example it may be 1,570 mm long, 80 mm wide, and 3 mm to 4 mm thick, depending on applications.

The plate 30 has holes 32 which are individually referenced 32-1, 32-2, . . . located opposite the holes 18 described with reference to FIG. 1. Similarly, it has holes 34 which are individually referenced 34-1, 34-2, and 34-3 which corresdponds to the holes 15. The holes 32 and 34 serve to receive screws enabling the plate 30 to be fixed to the support part 4.

The diameters of the holes 32 and 34 are respectively 4 mm and 5 mm, for example.

The portion 35 of the plate 30 which is cantilevered out from the low wall 17 is subdivided into tongues 38 by means of slots 39 which extend perpendicularly to the longitudinal dimension of the support part 4. The slots 39 which are individually referenced 39-1, 39-2, . . ., are 60 mm long, for example and not more than about 1 mm wide. The slots 39 may occur at 30 mm intervals from the end 31 of the plate 30. The slots 39 may be made by sawing or by laser cutting.

The device in accordance with the invention also includes resilient means situated between the tongues 38 and pressure transducers which are described below.

The resilient means are housed on the portion 16 of the support part 4 which is set back a little from the low wall 17.

The resilient means (not shown) comprise a layer of waterproof material which is chemically inert with respect to corrosive substances such as hydrocarbons and it is suitable for transmitting forces which may be applied thereto to the pressure transducers. Preferably, the resilient material is an elastomer, for example a synthetic rubber.

The hardness of this resilient material should lie between 30 and 35 on the Shore A scale.

For example, the resilient layers should be 1,500 mm long, 60 mm wide, and 4 mm thick.

The device further includes pressure transducers which are situated beneath the resilient means. The pressure transducers are connected as a contactless keyboard.

Figure 6:
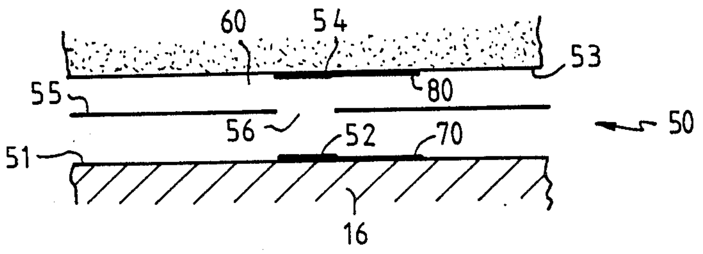
FIG. 6 is a diagram showing an embodiment of a key in accordance with the invention.

Reference is now made to FIG. 6 which shows a portion of a contactless keyboard 50 situated beneath the resilient layer.

The keyboard 50 comprises a bottom portion 51 which is in contact with the portion 16 of the support part 4 and which has first electrically conductive pads 52 formed thereon. The keyboard 50 also has a top portion 53 which is in contact with the resilient layer and on which second electrically conductive pads 54 are formed. The keyboard 50 finally comprises an intermediate portion 55 which is disposed between the top and bottom portions 51 and 53 and which has holes 56 formed therethrough to coincide with the pads 52 and 54. The portions 51, 53, and 55 of the keyboard 50 are made of an electrically insulating material such as Mylar.

The keyboard 50 is 1,500 mm long, 60 mm wide, and 0.5 mm thick, for example.

The conductive pads 52 and 54 are constituted by a fine layer of conductive ink which is preferably deposited by silkscreen printing.

Each conductive pad 52 or 54 is connected by means of an electric wire 70 or 80 to detection means which are described below and which are suitable for detecting (capacitive) electrical conduction between the pads 52 and 54.

The wires 70 and 80 are likewise constituted by fine layers of silkscreen-printed conducting ink.

Figure 7:
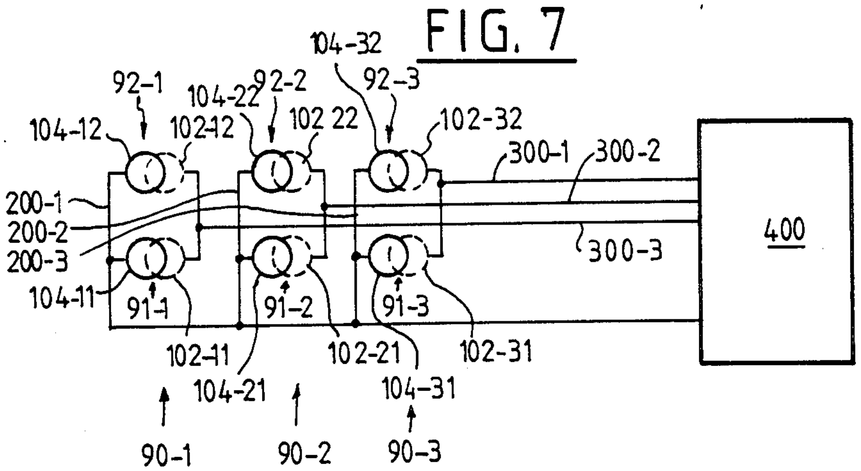
FIG. 7 is a diagram of an embodiment of a keyboard in accordance with the invention.

Reference is now made to FIG. 7 which is a diagram of an embodiment of a keyboard in accordance with the invention.

Each key 90 having an individual reference 90-1, 90-2, . . . comprises two half-keys 91 with individual references 91-1, 92-2, . . . and 92 with individual references 92-1, 92-2, . . . .

The half-keys 91-1, 91-2, . . . are defined by the overlap zone between a pad 102-11 and a pad 104-11, with a pad 102-21 and a pad 104-21, . . . .

The half-keys 92-1, 92-2, . . . are defined by the overlap zone between a pad 102-12 and a pad 104-12, and a pad 102-22 and a pad 104-22, . . . .

The wires 200 with individual references 200-1, 200-2, . . . connect respective ones of the conductive pads 104-11, 104-21, . . . to the conductive pads 104-12, 104-22, . . . .

Wires 300, individually referenced 300-1, 300-2, . . . connect respective conductive pads 102-11, 102-21, . . . to conductive pads 102-12, 102-22, . . . .

The wires 200 are connected in common and are connected via the waterproof connector 23 described with reference to FIG. 4 to detector means 400 which are preferably located outside the device in accordance with the invention. The wires 300 are connected individually via the waterproof connector 23 to the detector means 400.

Electrical connection means 350 constituted by the wires 200 and 300 are located in the void 12 described with reference to FIG. 1. The electrical connection means 350 include demultiplexer means for connecting the wires associated with the conductive pads in a matrix.

Figure 8:
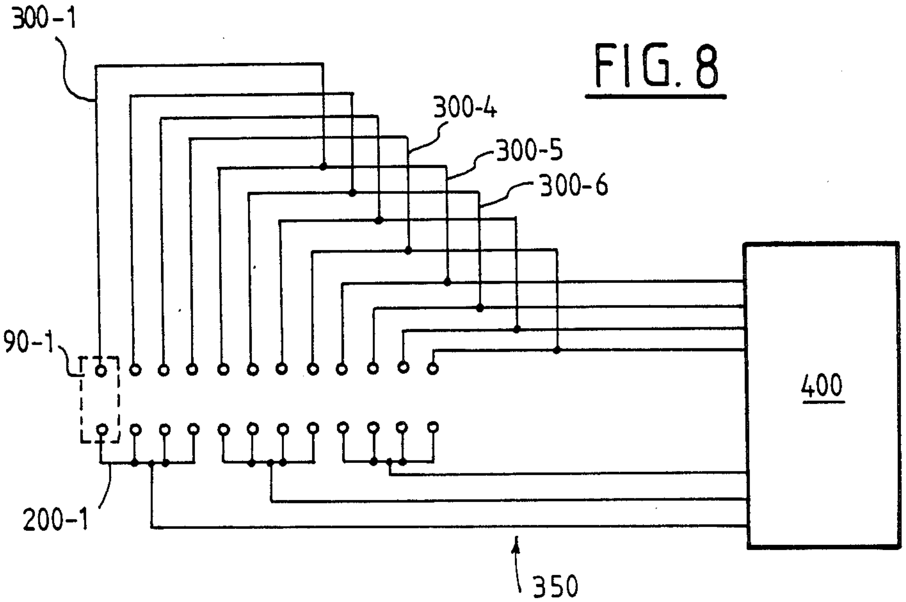
FIG. 8 is a diagram of one particular circuit for the electrical connection means in accordance with the invention.

Reference is now made to FIG. 8 which shows the electrical connection means connecting the keys to the detector means.

The wires 200 and 300 are organized as a matrix. The wires 200 are associated in fours and are connected to the detector means 400. Every fourth wire 300 is interconnected so that wire 300-1 is connected to wire 300-5, wire 300-2 is connected to 300-6, . . . . By arranging the wires in this way, a keyboard configuration is obtained which requires only seven wires to connect 12 keys 90 to the detector means: i.e. three wires 200 and four wires 300.

Naturally, this keyboard configuration could be modified for a device having a higher number of keys.

In the typical case of a device having 50 keys, the keyboard could be organized in an 8×7 matrix: i.e. it would have seven wires 200 associated as rows of eight wires 200 each, together with eight wires 300 associated in columns made up from every eighth wire 300 to constitute columns having seven wires each.

This configuration of the keyboard requires only 15 wires in all: seven wires 200 and eight wires 300 which suffice to connect all 50 keys 90 to the detector means 400.

The detector means 400 are of conventional type. They may include a pulse counter or any other means suitable for detecting electrical conduction between the top and bottom portions of the keyboard.

The device described above with reference to FIGS. 1 to 8 operates as follows.

Two devices as described with reference to FIGS. 1 to 8 are embedded in a traffic path or lane having a total width of 3 meters, for example, thereby making it possible to measure the width of the tires and the spacing between the tires of any vehicle running along said path.

The two devices are laid across the path head-to-head, i.e. the end 5 of one of the devices is end-on with the end 5 of the other device while the end 8 including the connector 23 of one of the devices is located on one side of the path while the end 8 including the connector 23 of the other device is located at the other side of the path. The connectors 23 are thus far apart and are connected by electrical connections to the detector means which are disposed off the path.

When a vehicle passes over the devices disposed head-to-head and embedded in the path, the tires of the vehicle actuate the tongues 38 of the plates 30 under the effect of gravity. The resilient means transmit the forces which are applied thereto to the keys 90 of the keyboards. The keys 90 as activated by the tongues 38 transmit electrical signals to the detector means 400 via the electrical connection means 350.

The widths of the tires and the distance between the tires can be deduced from the number of keys which are excited and consequently from the number of signals transmitted to the detector means, taking account of the widths of the tongues and the angle between the devices and the direction of vehicle travel on the path.

Naturally, the length of the device could be doubled, thereby enabling the entire width of a path to be monitored by embedding a single device therein. However, the component parts of a device that long would be more difficult to manufacture.

I claim:

1. A device for detecting a dimension, in particular a tread width on a path, the device comprising:

an elongate support part suitable for being embedded in the path and having a low upstanding wall running along one edge thereof;

a plate cantilevered out from the low wall with its cantilevered portion being subdivided into tongues by slots which extend perpendicularly to the longitudinal direction of the support part;

pressure transducers received in the support part beneath said tongues;

resilient means between the tongues and the transducers; and electrical connection means making connections with the pressure transducers.

2. A device according to claim 1, wherein the pressure transducers are organized as a contactless keyboard.

3. A device according to claim 2, wherein the keyboard comprises a bottom portion having first electrically conductive pads thereon, a top portion having second electrically conductive pads thereon facing said first pads, and an intermediate portion made of electrically insulating material interposed between the top and bottom portions of the keyboard and having holes therethrough level with said first and second pads, with a key being defined by the overlap zone between a particular first pad of the bottom portion and a particular second pad of the top portion, with the keys being connected by the connection means to detection means suitable for detecting electrical conduction between the bottom portion and the top portion of the keyboard.

4. A device according to claim 3, wherein at least one key has a tongue thereover.

5. A device according to claim 3, wherein each conductive pad of the keyboard comprises two half-pads which are interconnected by an electric wire which is connected to the detector means.

6. A device according to claim 5, wherein the electrical connection means include demultiplexer means for organizing the electric wires associated with the conductive pads as a matrix.

7. A device according to claim 1, wherein the resilient means comprise a layer of waterproof material which is chemically inert with respect to corrosive substances such as hydrocarbons and which is suitable for transmitting forces applied thereto to the pressure transducers.

8. A device according to claim 7, wherein the resilient material is an elastomer, e.g. a synthetic rubber.

9. A device according to claim 1, wherein the material constituting the support part is a metal alloy, e.g. an aluminum alloy.

10. A device according to claim 1, wherein the material constituting the plate is stainless steel.

* * * * *